US009031228B2

(12) United States Patent
Ciet et al.

(10) Patent No.: US 9,031,228 B2
(45) Date of Patent: *May 12, 2015

(54) SYSTEMS AND METHODS FOR IMPLEMENTING BLOCK CIPHER ALGORITHMS ON ATTACKER-CONTROLLED SYSTEMS

(75) Inventors: Mathieu Ciet, Paris (FR); Augustin J. Farrugia, Cupertino, CA (US); Filip Toma Paun, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,385

(22) Filed: Apr. 16, 2012

(65) Prior Publication Data
US 2012/0201374 A1    Aug. 9, 2012

Related U.S. Application Data

(63) Continuation of application No. 12/203,120, filed on Sep. 2, 2008, now Pat. No. 8,175,265.

(51) Int. Cl.
*H04L 9/28* (2006.01)
*H04L 9/00* (2006.01)
*H04L 9/06* (2006.01)

(52) U.S. Cl.
CPC .............. *H04L 9/002* (2013.01); *H04L 9/0618* (2013.01); *H04L 9/0631* (2013.01); *H04L 2209/043* (2013.01); *H04L 2209/125* (2013.01); *H04L 2209/122* (2013.01); *H04L 2209/16* (2013.01)

(58) Field of Classification Search
CPC ... H04L 2209/043; H04L 9/0687; H04L 9/06; H04L 9/0675; H04L 9/002; H04L 9/0618; H04L 9/0631; H04L 2209/16

USPC ................ 380/28, 29, 44, 278; 713/150, 189
See application file for complete search history.

(56) References Cited

U.S. PATENT DOCUMENTS 6,360,019 B1    3/2002    Chaddha
7,003,106 B2    2/2006    Ouyang
(Continued)

OTHER PUBLICATIONS

2001 IEEE Workshop on Signal Processing Systems, pp. 349-360, title "Rijndael EPGA implementation utilizing look-up tables" date Sep. 28, 2001, author McLoone et al.*
Aug. 16, 2002, the post-proceedings of the 9th Annual Workshop on Selected Areas in Cryptography (SAC '02), S.Chow et al.*
(Continued)

*Primary Examiner* — Saleh Najjar
*Assistant Examiner* — Peiliang Pan
(74) *Attorney, Agent, or Firm* — Novak Druce Connolly Bove + Quigg LLP

(57) ABSTRACT

Systems and methods for an implementation of block cipher algorithms (e.g., AES) use lookup tables to obscure key information, increasing difficulty of reverse engineering efforts. The implementation encodes round key information into a first plurality of tables (T1), which when used for lookup operations also complete SubBytes operations, and output state in an encoded format. A Shiftrows operation is performed arithmetically on the output state. A second plurality of tables (T2) are used to perform a polynomial multiplication portion of MixColumns operation, and an XOR portion of MixColumns is performed arithmetically on the columns. Encoding from the T1 tables is made to match a decoding built into the T2 tables. Subsets of the T1 tables use the same T2 tables, reducing a memory footprint for the T2 tables. Multiple AES keys can be embedded in different sets of T1 tables that encode for the same set of T2 tables.

13 Claims, 9 Drawing Sheets

(56) References Cited

U.S. PATENT DOCUMENTS

| | | |
|---|---|---|
| 7,106,864 B2 * | 9/2006 | Kocarev et al. ............... 380/263 |
| 7,801,254 B1 | 9/2010 | Burd et al. |
| 2003/0072445 A1 * | 4/2003 | Kuhlman et al. ............... 380/42 |
| 2005/0166069 A1 | 7/2005 | Hashimoto et al. |
| 2006/0010191 A1 | 1/2006 | Takahashi et al. |
| 2008/0025496 A1 * | 1/2008 | Smith et al. ...................... 380/28 |
| 2009/0060176 A1 | 3/2009 | Yokota et al. |
| 2009/0060190 A1 | 3/2009 | Bauchot |
| 2009/0113266 A1 | 4/2009 | Wegener |
| 2009/0168999 A1 * | 7/2009 | Boswell et al. ................. 380/44 |
| 2009/0185678 A1 | 7/2009 | Walter et al. |
| 2010/0080395 A1 | 4/2010 | Michiels et al. |
| 2010/0091861 A1 | 4/2010 | Sung |
| 2010/0172494 A1 * | 7/2010 | Henson et al. ................. 380/28 |
| 2011/0179281 A1 | 7/2011 | Chevallier-Mames et al. |
| 2012/0144205 A1 * | 6/2012 | Shu et al. ....................... 713/189 |
| 2012/0210120 A1 * | 8/2012 | Irvine ........................... 713/150 |

OTHER PUBLICATIONS

"Advanced Encryption Standard," From Wikipedia, the free encyclopedia, Wikimedia Foundation Inc., San Francisco, CA. (Available at http://en.wikipedia.org/wiki/Advanced_Encryption_Standard, last visited on Aug. 11, 2008.).

S. Chow, P. Eisen, H. Johnson, P.C. van Oorschot, "White-Box Cryptography and an AES Implementation," Lecture Notes in Computer Science, vol. 2595, Revised Papers from the 9th Annual International Workshop on Selected Areas in Cryptography, pp. 250-270, 2002.

"Federal Information Processing Standards Publication 197: Announcing the Advanced Encryption Standard (AES)," National Institute of Standards and Technology, Nov. 26, 2001. (Available at http://csrc.nist.gov/publications/fips/fips197/fips-197.pdf, last visited on Aug. 22, 2008.).

N/A, , "Sequences of Numbers in Ruby (Collatz Problem)", Recurial, Sep. 23, 2011.

Wang, Zhi et al., "Linear Obfuscation to Combat Symbolic Execution", Sep. 12-14, 2011.

* cited by examiner

SYSTEMS AND METHODS FOR IMPLEMENTING BLOCK CIPHER ALGORITHMS ON ATTACKER-CONTROLLED SYSTEMS

CROSS-REFERENCE TO RELATED APPLICATIONS

This application is a continuation of U.S. patent application Ser. No. 12/203,120, filed on Sep. 2, 2008, entitled "SYSTEMS AND METHODS FOR IMPLEMENTING BLOCK CIPHER ALGORITHMS ON ATTACKER-CONTROLLED SYSTEMS", which is incorporated by reference in its entirety, for all purposes, herein.

BACKGROUND

1. Field

The following relates to systems and methods for performing encryption and more particularly to systems and methods for performing encryption on a platform on which an attacker has privileges, such as privileges to observe execution or modify execution of an encryption algorithm.

2. Related Art

Many encryption algorithms are primarily concerned with producing encrypted data that is resistant to decoding by an attacker who can interact with the encryption algorithm as a "black box" model, and cannot observe internal workings of the algorithm, or memory contents, and so on. A black box model may be appropriate for applications where trusted parties control machines involved both in encoding and in decoding ciphered materials.

However, many applications of encryption do not allow for an assumption that an attacker cannot view internal workings of the algorithm. For example, encrypted digital media often needs to be decrypted on systems that are completely controlled by an adversary. There are many degrees to which the black box model can be relaxed. An extreme relaxation is called the "white box" model. In a white box model, it is presumed that an attacker has total access to a system performing an encryption, including being able to observe directly a state of memory, program execution, and so on. In such a model, an encryption key can be observed in/extracted from memory, and so ways to conceal operations indicative of a secret key are important.

The Advanced Encryption Standard (AES) is a well-known symmetric key block cipher. There are a variety of references that describe it, for example, "Advanced Encryption Standard" Wikipedia, The Free Encyclopedia (available at http://en.wikipedia.org/aes).

To implement AES (128 bit blocks, 10 rounds) arithmetically involves the following operations: (1) 11 AddRoundKey operations (1 prior to 10 rounds), (2) 10 SubByte operations, (3) 10 ShiftRow Operations, and (4) 9 MixColumn Operations. Each round of rounds 1-9 consists of (1)-(4), where output from one step is input to the next step, and output from (4) is input to (1). Round 10 consists of (1)-(3), where output from (3) is the output used. Arithmetic implementations of AES do not provide much security against an attacker recovering a secret key, if the attacker has privileged access to the system implementing the cipher.

The reference "White-Box Cryptography and an AES implementation" *Lecture Notes in Computer Science Vol. 2595, Revised Papers from the 9th Annual International Workshop on Selected Areas in Cryptography* pp. 250-270 (2002) by Chow et al. (Chow) discloses implementations of AES that obscures the operations performed during AES by using table lookups to obscure the secret key within the lookup tables, and obscure intermediate state information that would otherwise be available in arithmetic implementations of AES.

Chow uses 160 separate tables to implement the 11 AddRoundKey operations and 10 SubByte Operations (10 rounds, with 16 tables per round, where each table is for 1 byte of the 16 byte-128 bit-AES block). These 160 tables embed a particular AES key, such that output from lookups involving these tables embeds data that would normally result from the AddRoundKey and SubByte operations of the AES algorithm, except that this data includes errors that make it more difficult to determine what parts of these tables represent round key information derived from the AES key.

Chow uses 1008 separate tables to implement the 9 MixColumn Operations (there is no MixColumn operation in the $10^{th}$ round of AES). One type of these tables implements a multiplication of one byte with the AES MixColumn polynomial (per the specification), and another type implements the XOR part of MixColumn. Each table is used once during the 9 rounds.

Collectively, these tables require over 400 KB to store, which is a large memory footprint. Chow does not disclose smaller memory footprint whitebox implementations, or implementations that are more scalable. Thus, it would be desirable to have white box functionality for encryption algorithms with a smaller memory footprint, and/or which provide better scalability.

SUMMARY

Aspects include computer readable media storing code and data for implementing portions of a block encryption cipher comprising operations on an M column by N row byte array of state. The portions of the cipher implemented include rounds of operations including a row shifting operation, a column mixing operation, a byte substitution operation, and an operation adding key material derived from a symmetric key. In some ciphers, other portions of the cipher may include one or more rounds of the above operations, without the column mixing operation, for example in a last round. The code and data, for the rounds of interest are for operation on masked state to obscure data that can be used by an attacker to obtain the key material, while allowing production of a ciphered block according to the cipher.

The media store a respective array of first tables for each round. Each array has a different table for each byte of masked state, and embeds key material for the round. The key material is embedded among first table masking data. The usage of the array causes the key material to be added to the masked state in the round to which the array corresponds, and also affects the masked state according to the byte substitution operation, while causing the state to be masked in a variable and repetitious pattern determined by selection of the first table masking data.

The media also store a plurality of second tables, numbering fewer than the first tables. Each second table comprises M*N entries, each of N bytes, to be used in the column mixing operation. The second tables are composed to operate on state masked according to the pattern. The media also store computer executable code for iterating a number of rounds.

In each round, the code uses each byte of the masked state as an index to a different first table in the respective first table array for that round. The indexing identifies a respective byte substituting for the indexing masked state byte. After completely substituting bytes from the arrays into the masked state, the state remains masked according to the pattern.

The code also performs the row shifting operation on the masked state. The code also performs, for each column of masked state, a polynomial multiplication portion of the column mixing operation by indexing a selected second table with each byte of the masked state. The second table for each byte is selected according to the pattern. The indexing for each column produces N intermediate columns to be XOR'ed arithmetically, resulting collectively in state masked for a subsequent iteration.

The first tables and the second tables are constructed to follow the variable and repetitious masking pattern, allowing reuse of the second tables in one or more of indexing by multiple bytes of masked state during a single round, and indexing by bytes of masked state among multiple of the rounds.

In the above described media aspect, the first tables can embed round key material for a pre-determined encryption key. The media also can store additional arrays of first tables that each embed round key material for other keys. The first tables for each of the different symmetric keys include first table masking data so that the variable and repetitious masking pattern is followed by the system for using all of these keys, including that corresponding second tables can be reused among operations involving each of the keys.

In an example, the array of first tables includes 144 tables, each of the 144 embedding AES round key information in subsets of 16 tables. One subset is for each of rounds 1 through 9 of a 10 round AES implementation on a 128 bit block, while another 16 tables can be used for a tenth round, not involving a mix column operation, and which is not of concern in these examples Another aspect include media storing code and data for implementing portions of a block cipher decryption. These portions include operations performed on an M column by N row byte array of state. The operations comprise a number of rounds of an inverse row shifting operation, an inverse column mixing operation, an inverse byte substitution operation, and an operation adding key material derived from a symmetric key. The code operates on masked state to obscure data that can be used by an attacker to obtain the key material, while allowing production of an appropriately deciphered block. \

The media stores a respective array of first tables for each round. Each array has a different table for each byte of masked state. Each array embeds key material, in first table masking data, to be added to the masked state in the round to which the array corresponds. In use, each array also is for affecting the masked state according to the inverse byte substitution operation, while causing the state to be masked in a variable and repetitious pattern determined by selection of the first table masking data.

The media also stores a plurality of second tables, numbering fewer than the first tables. Each second table comprises M*N N byte entries to be used in the column mixing operation. The second tables are composed to operate on state masked according to the pattern. The media also store computer executable code for iterating a number of rounds, and in each current round, for code is for performing the following operations.

The code is for an operation performing, for each column of masked state, a polynomial multiplication portion of the column mixing operation by indexing a selected second table with each byte of the column. The second table for each byte is selected according to the pattern. The indexing for each column produces N intermediate columns to be XOR'ed arithmetically, resulting collectively in state masked according to the pattern.

The code also is for performing the inverse row shifting operation on the masked state. The code further is for using each byte of the masked state as an index to a different first table in the respective first table array for that round. The indexing identifies a respective byte substituting for the indexing masked state byte. After completely substituting bytes from the arrays into the masked state, the state remains masked according to the pattern for use in a subsequent round.

The first tables and the second tables are constructed jointly to follow the variable and repetitious masking pattern, allowing reuse of the second tables in one or more of indexing by multiple bytes of masked state during a single round, and indexing by bytes of masked state among multiple of the rounds so that the decrypting operations can be effected with the masked state, while ultimately producing state that can be used to recover an original source block. The system also comprises a processor operable to execute the computer executable code and access the one or more computer readable media.

As in the encryption example, the media can store data for a plurality of different keys by having round key materials for each key embedded in respective tables that each can include masking data selected so that each of those tables can be used to produce output state (after indexing) that is compatible with the masking pattern, allowing reuse of the second tables among all such keys according to the variable and repetitious pattern.

In these examples, the pattern can be variable yet repetitious in a number of ways. For example, the pattern can cause repeatedly correspond the same T2 table to different bytes of state from a single column, for half of the bytes in a single column, or for all the bytes in a single column within a round. The correspondence between T2 tables and bytes of state may be varied between the rounds. For example, the same T2 table can correspond to a byte of state in the same position for each of multiple rounds (e.g., 3 rounds or nine rounds), while allowing variance in T2 table correspondence among other bytes of the state.

In some implementations, there are 144 tables embedding round key material for each key used in the system, for use in 9 rounds of a 10 round encryption or decryption. By contrast, by appropriate selection of masking data, the pattern can be established to allow the system to have access to only 4, 8, 12, 16, 24, 32, 48, and 72 second tables. Thus, with fewer second tables, the system would reuse second tables more, with less variation in the pattern. Such an implementation can be desirable for a 10 round AES encryption/decryption on 128 bit blocks, with 128 bit keys. Various particular implementations can be constructed according to these examples, as explained below.

In these examples, the state can be referenced with a pointer identifying a storage location for the state in a working memory implemented in either the non-volatile storage or a random access memory resource. Each operation can operate on that state, or can create a copy to be outputted. Thus, the description of input and output state need not necessarily refer to distinct data, but rather than data manipulations were conducted on data during such operations, resulting in data for subsequent use.

Further aspects include a method for producing an implementation of a block cipher to be performed over a number of rounds. The method comprises constructing a first set of tables that embeds round key information for a known symmetric key among other data. The first set of tables can be used in the systems, methods, and stored on computer readable media described above. In particular, the first set of tables can be used in producing output state from a combination of an AddRoundKey and SubBytes operation by using input state to index round-specific subsets of the first set of tables. The other data of the first set of tables are selected based on expecting input state to be masked in a first format, and to produce output state masked in a round-dependent format. The method also comprises constructing a second set of tables. The tables are constructed so that round-specific subsets of the second set of tables can be selected for use in performing a polynomial multiplication portion of a MixColumn operation, based on the output mask format pattern applied during the AddRoundKey and SubBytes operations. The output state produced from use of the first set of tables can be used to index subsets of the second set of tables, for producing masked input state for input in a subsequent round involving the first set of tables. In the method, the first set of tables and the second set of tables are constructed so that each table of the second set is used at least twice in one or more of a single round and amongst multiple of the rounds of the block cipher.

Other aspects include methods and computer readable media generally in accordance with the above summary and the following description. Still other aspects can include respective means equivalent to those described for performing the functionality described herein.

DESCRIPTION

Although AES is a well-understood cipher, but some particular aspects of it are described here, for context. In one instance, AES operates on 128 bit blocks, with a 128 bit key, and performs 10 rounds of the ciphering steps. The disclosures herein can be extrapolated to using other block sizes and other numbers of rounds, e.g., 192, 256 bit blocks and 12, and 14 rounds respectively. However, for clarity, these disclosures focus on the example of 128 bit blocks, 128 bit keys, and 10 total rounds (referenced simply as AES). The following description also focuses primarily on encryption, with the understanding that decryption operations can proceed as an inverse of the encryption operations, with implementation disclosures described herein. Also, aspects of the Chow reference are discussed, where it may be helpful in understanding the present disclosures and/or for additional disclosures concerning construction of tables described below.

AES uses 128 bit blocks, organized into 4×4 byte arrays. AES comprises an initial AddRoundKey operation, followed by 9 rounds of the following operations: AddRoundKey, SubBytes, ShiftRows, and MixColumns, followed by a $10^{th}$ round of operations AddRoundKey, SubBytes, and ShiftRows. Other formulations also describe functional equivalents to AES. Such formulations include 9 rounds of AddRoundKey, SubBytes, ShiftRows, and MixColumns operations, followed by a tenth round of operations AddRoundkey, SubBytes, ShiftRows, and AddRoundKey.

The term "state" can be used to refer to the 4×4 arrays of bytes during ciphering, which are passed between constituent cipher operations, and as such "state" can refer to these intermediate ciphering results.

Figure 1:
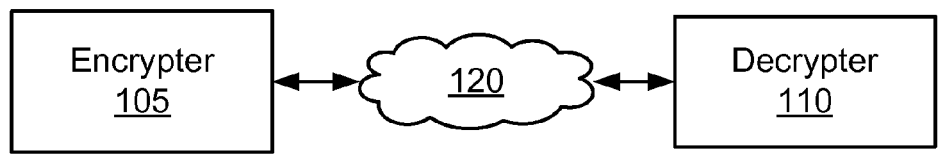
FIG. 1 illustrates a context in which AES encryption/decryption according to the following can be deployed.

FIG. 1 illustrates a high level context 100 in which aspects disclosed herein can be implemented. Context 100 illustrates that an encrypting entity 105 communicates over a network 120 with a decrypting entity 110. Encrypting entity 104 can use a pre-shared AES key (i.e., a key known to both entity 105 and 110) to encrypt information that will be decrypted by decrypting entity 110. Such a key can be pre-shared using asymmetric key encryption. Communication link 120 can include direct connections, such as point to point wireless or wired communications, or infrared, ultrawideband technologies, Bluetooth and so on. Such communication links also can include packet networks, and interconnected packet networks, such as the Internet. Such communication links also can include inter-process communications, to allow one process running on a computer to authenticate with another process running on the same computer. Still further examples of communication link 120 can include exchange of physical media, and/or a combination of physical media with another communication technology. For example, content such as an e-book or a song can be encrypted using a key, and provided to decoding entity 110, which will decrypt the media in order to perform it. As would be understood, these disclosures are exemplary, and are not limiting of the usages of examples and other aspects disclosed herein.

Figure 2:
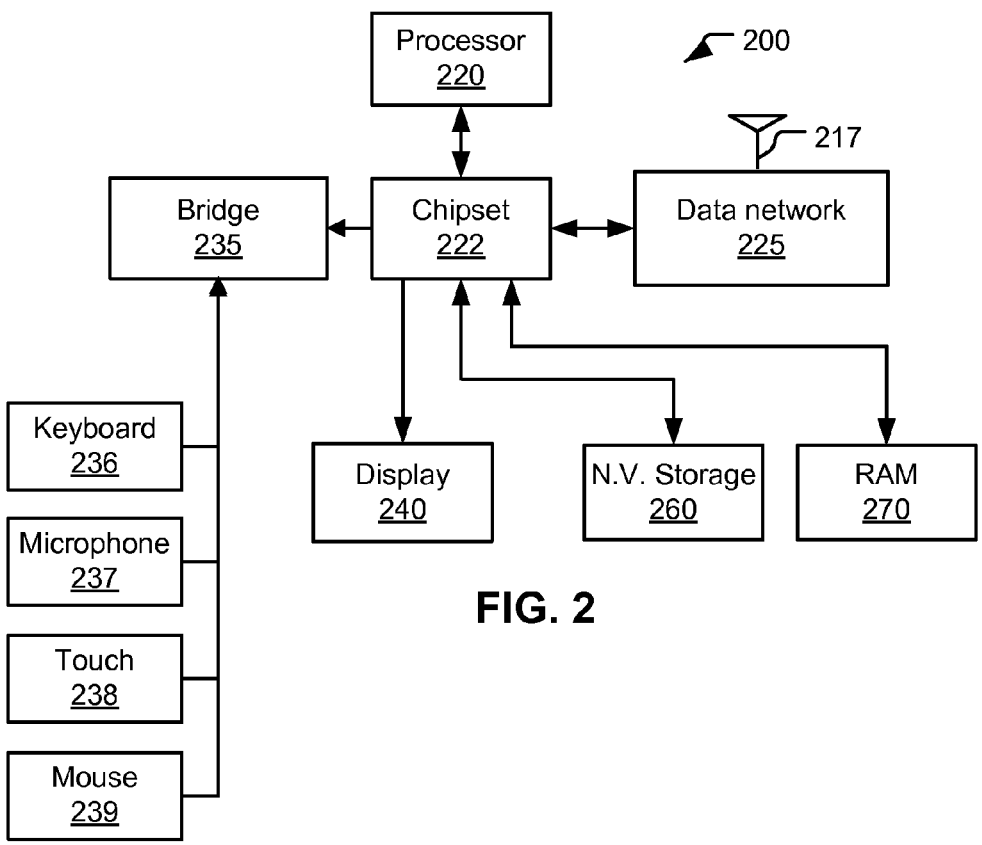
FIG. 2 illustrates components of an example system that can be used in FIG. 1.

FIG. 2 illustrates example components of a system 200 which can be used to implement one or more of encoding entity 105 and encoding entity 110. System 200 comprises a process 220 communicating with a chipset 222. Chipset 222 communicates with user interface 235 equipment. Example of such equipment include one or more of a keyboard, a microphone 237 (and potentially other intermediate processing equipment used in voice recognition), touch screen input 238, and mouse input 239. Chipset 222 also includes an interface to a display 240, and an interface to non-volatile storage 260. Non-volatile storage 260 can comprise hard drives, flash drives, optical storage, state-change memory, and any other types of storage that can retail information without power consumption. Chipset 270 also communicates with a random access memory (RAM) 270, which can be used as a working memory during program execution. In some implementations non-volatile storage and RAM can be implemented partially or wholly using the same physical memory resources. In example system 200, chipset 222 also communicates with a data network interface 225 for data communications. Network interface 225 can implement any of a variety of technologies, from short range wireless (e.g., Bluetooth), to local area wireless (e.g., 802.11a, b, g, n, and so on), to broadband wireless (e.g., Edge, CDMA-W, HSDPA, and so on). Network interface 225 also can comprise wired links, such as IEEE 1394, Ethernet and so on. In some implementations, the interface 225 also can be comprised in the interface to display 240, for example, for DVI or HDMI connections, where encryption or other security-related operations may be desired.

Processor 220 can include a general purpose CPU controlled by software as well as a special-purpose processor. Separately illustrated components of system 200 may be implemented with fewer separate physically distinct units, since system on chip implementations can often be cost-effective, as well as saving on area and space occupied by system 200. System 200 may also have such functions distributed among multiple physically or logically distinct entities. For example, system 200 can have multiple processors, or a processor with multiple cores.

Links among functional components of system 200 also may be any of several types of bus structures including a memory bus or memory controller, a peripheral bus, and a local bus using any of a variety of bus architectures. A basic input/output (BIOS) may provide the basic routine that helps to transfer information between elements within the computing device 100, such as during start-up. The basic components are known to those of skill in the art and appropriate variations are contemplated depending on the type of device, such as whether the device is a small, handheld computing device, a desktop computer, or a computer server.

As described in further detail below, example implementations include implementing described logical operations using one or more of (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules and/or program engines within the programmable circuits.

The above description of computational resources, communication links and other potential configurations of these resources with computer-executable code according to the following description provide means for providing the functions described. For example, the following description includes description of using table lookups implemented in a computing resource (e.g., processor 220) to perform component functions of an AES encryption or a decryption operation. The computing resource, configured with such code and accessing the tables provides a means for performing such component functions. Other means provided for in this description can include other ways to implement table lookups, including usage of custom-built processors that can perform hard-coded or firmware encoded operations implementing such lookups.

Figure 3:
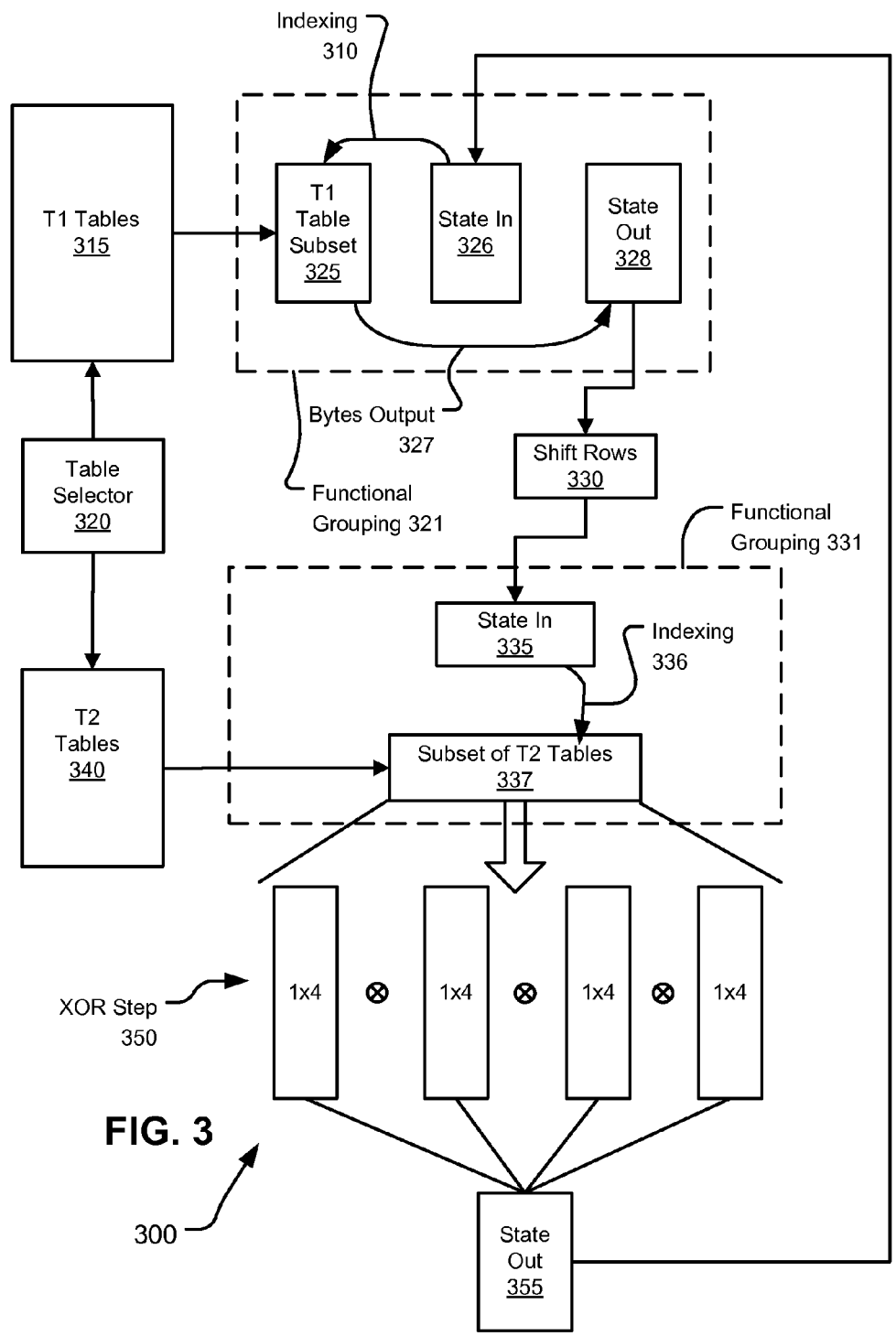
FIG. 3 illustrates an example encrypting flow according to described aspects.

FIG. 3 illustrates an example flow 300 for AES encoding according to aspects disclosed herein, which be implemented in system 200. Flow 300 illustrates operations of one round of rounds one through nine, and thus loops to perform these nine rounds. Also, flow 300 does not concern the AES round not including a MixColumns operation.

In flow 300, a table selector 320 interfaces with a set of T1 tables 315 and a set of T2 tables 340 (significance and usage of T1 and T2 tables is described below). Table selector 320 interfaces to cause subsets of the T1 tables to be selected and provided to functional grouping 321, which as will be described below, implements AddRoundKey and SubBytes operations in each round.

As will be described below, each T1 Table subset (identified as subset 325 in FIG. 3) can change with each round. In the case of AES, each subset of tables includes 16 tables, each table having 256 entries, each of one byte in length (making a size of each table 256 bytes). Thus, with particular regard to rounds 1 through 9 of an encryption process (and conversely a decryption process), 144 tables would be needed to implement the nine rounds that also involve a MixColumns operation (16*9), and a total of 160 tables would be needed for all rounds (16*10). In sum, for a single key, T1 tables 315 thus includes 160 tables, each having 256 entries of one byte. For convenience, each table can be considered as a square array, such that there are 16×16 byte entries. Each subset 325 from T1 Tables 315 includes 16 of the tables.

Functional group 321 operates on state 326 inputted to it, and produces output state 328. Each of input state 326 and output state 328 is a 4×4 byte array (for the specific example of standard AES here). Thus, the state can be viewed as 16 separate entries each of a byte in length. As described above, T1 table subset 325 providing 16 tables, each having 256 entries of a byte in length. Each byte of the state is thus used as an index to a different one of the tables in T1 table subset 325 to identify an entry in its respective table. That entry is also 1 byte, and replaces the byte of the state used to identify that entry in output state 328 (bytes output 327 represents the identified byte of each T1 table substituting into output state 328).

Thus, each byte of state can be used as an index into a different T1 table, and that index can identify a unique entry among the 256 entries of that T1 table, the unique entry also being a byte in length.

As disclosed above, functional grouping 321 implements AddRoundKey and SubBytes operations, and thus T1 Tables 315 embed AES round key material. However, the AES round key material is embedded within encoding that produces an output state in an encoded format. Here encoded is used to indicate that output state 328 includes information that would be expected to be present after performing AddRoundKey and Subbytes in an AES round, but in a format that increases a difficulty of using output state 328 in recovering round key material from T1 tables 315. As will be described below, the encoding follows a format that allows repetition in usage of T2 tables 340, while maintaining some variability, and hence reducing a memory footprint to store T2 tables 340, while maintaining some concealment of data that can be used in determining the key.

Flow 300 continues, after formation of output state 328, with ShiftRows 330, which implements the AES prescribed row shifting, and then outputs state to a functional grouping 331. Functional grouping 331 receives the state from the ShiftRows operation in input state 335. As described below, input state 335 is used in functional grouping 331 to index a subset of T2 tables 337 provided from T2 tables 340.

Functional grouping 331 is for implementing a polynomial multiplication portion of a MixColumns operation. MixColumns is for scrambling data within a column of state (i.e., scrambling a 4 byte column). For each column of the four columns comprising AES state, four 256 entry tables are used, where each entry of each table is 4 bytes. Thus, each byte of a column is used as an index in indexing 336 to identify 4 bytes of data from one of the T2 tables. Thus, functional grouping 331 produces 4 separate sets of 4 bytes of data and outputs that data to an XOR step 350, to produce one column of an output state 355. Thus, functional grouping is executed for each of the four columns of input state 335 to produce the 4 columns, each with 4 bytes of output state 355. The output state 355 is communicated to be used as input state 326 in a subsequent round. In view of the above, each T2 table comprises 256 entries of 4 bytes each, making each T2 table 1 kbyte in size. With respect to describing T1 tables above, it was described that output state 328 was encoded. The encoding provided in output state 328 is matched within the T2 tables such that the T2 tables produce output in an encoded format that in turn can be XOR'ed in step 350 to produce state for input in a subsequent round.

The encoding pattern can be described by specifying which T2 table is to be used in functional group 331 for a given byte of input state 335. In turn, because a given T1 table is used to determine a given byte of the state, the T1 table can be formed to allow use of a particular T2 table, while still properly performing AddRoundKey and SubBytes operations.

T2 tables are 1 kbyte in size, and reducing a memory footprint of AES encryptors and/or decryptors can be accomplished by reducing a number of distinct T2 tables used in that implementation. One way to provide such reduction is to share T2 tables by encoding T1 tables to provide a desired repetition (with variance) in the encoding pattern of state outputted from functional grouping 321. The following figures illustrate different ways in which such T2 tables can be shared.

Figure 4:
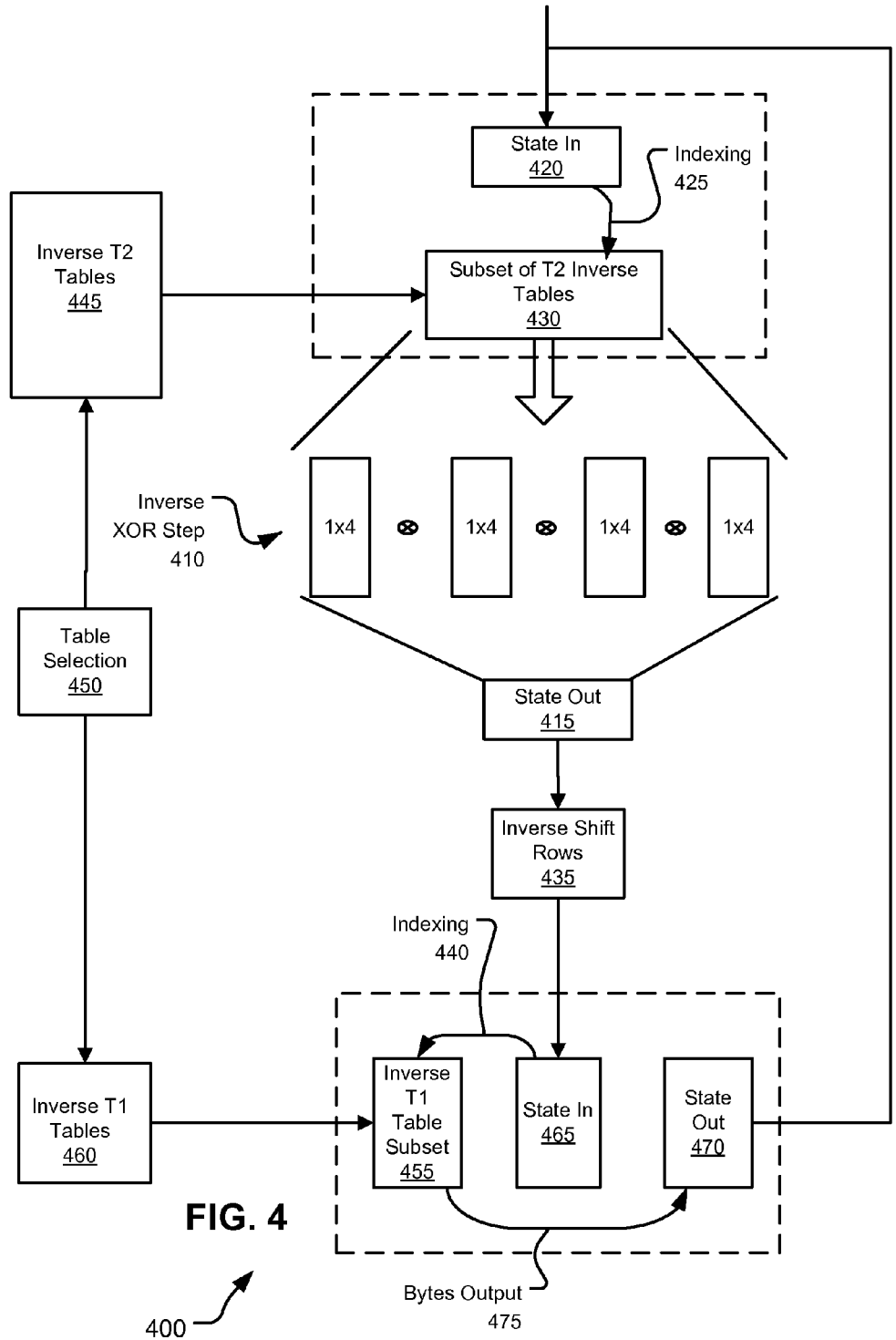
FIG. 4 illustrates an example decrypting flow according to described aspects.

FIG. 4 illustrates a flow 400 implementing a decryption process according to aspects described herein. Such aspects include implementing some constituent decryption operations using table lookups, described in more detail below. Like flow 300 of FIG. 3, flow 400 also is illustrated from a perspective relating to rounds involving an Inverse MixColumns (InvMixColumns) operation (as flow 300 related to those rounds using a MixColumns operation). Thus, flow 400 includes receiving state 420 and using values in state 420 as indexes into a subset 430 of T2 Inverse Tables 445. Outputs from the result of such indexing include, for each column of state, 4 columns (each identified as 1×4, meaning one column of 4 bytes), each having the same number of bytes as a single column of the state. These 4 columns are XOR'ed arithmetically 410, which produces one column of state identified as state 415. Thus, usage of input state 420 for indexing 425 of T2 inverse table subset 430 performs a polynomial multiplication portion of InvMixColumns, while XOR 410 is its own inverse. Output state 415 is provided to an Inverse ShiftRows operation 435, which produces state 465. Bytes of state 465 are used in indexing 440 of an Inverse T1 table subset 455 of Inverse T1 tables 460 to produce bytes output 475, which collectively form output state 470, which is used in a subsequent round, illustrated by connection to state input 420.

Flow 400, like flow 300 operates with masked state, where the state is masked according to a variable and repetitious pattern. The degree to which the masking pattern repeats versus its degree of variability determines how many Inverse T2 tables are used in the decryption, which also determines how often Inverse T2 tables 440 are reused for a particular decryption operation. The Inverse T1 tables 470 are formed to embed round key material for a pre-determined key, among data to establish the desired variable and repetitious masking pattern, and to perform an Inverse SubBytes operation.

Likewise, Inverse T2 tables 445 are constructed to result in masked state, after indexing 425 and XOR 410 that adheres to a mask format useful in indexing 440 of Inverse T1 table subset 455. Since the masking adheres to a variable and repetitious pattern, each respective subset 430 of Inverse T2 tables used in a particular round is to be composed of a selection of Inverse T2 tables 445 adhering to the pattern. Examples of such patterns are illustrated in FIGS. 5-9, and explained in description relating thereto. As also will be explained, other example patterns can include hybrids of the example patterns illustrated in FIGS. 5-9.

Both flow 300 and flow 400 involve using a respective variable and repetitious mask pattern applied to observable state. These patterns need not be the same for encryption and decryption operations, since flow 300 allows production of an appropriately ciphered block, which can be decrypted according to any compliant methodology with the key used during encryption, including one involving flow 400, with a different pattern than what was used during encryption. Further, flow 300 can use different patterns to encrypt different blocks, in a single stream of data, and/or in multiple concurrent data streams (and conversely flow 400 can as well).

Figure 5:
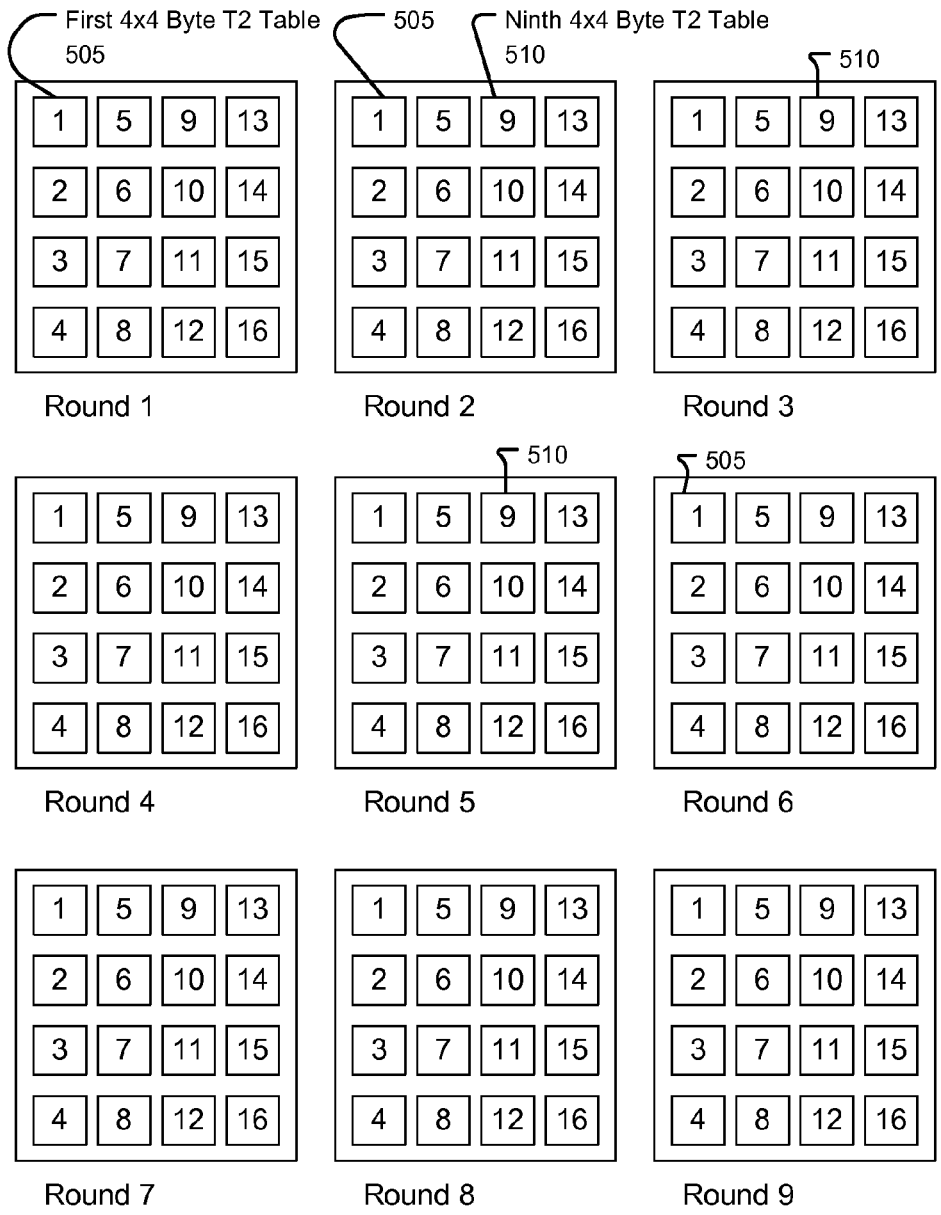
FIGS. 5-9 illustrate examples of table formats and patterns of table repetition according to these disclosures.

FIG. 5 illustrates an example 500 identifying 144 T1 tables, each with its own box, through rounds 1 through 9 (16 T1 tables per round), with 16 different T2 tables used in a pattern corresponding to the 144 T1 tables. A few of the T2 tables are identified individually, such as first table 505, and ninth table 510. As can be inferred, each time a given number of T2 table appears in a box in FIG. 5, it indicates that the numbered T2 table is used in the MixColumn operation for state involving that T1 table. For each, several appearances of first table 505 are noted, in round 1, round 2, and round 6. A pattern of reuse of T2 tables illustrated in example 500 is that the same T2 table used in each round for the same portion of the state, such that each T2 table is reused 9 times, meaning that only 16 unique T2 tables are required and a total memory footprint for T2 tables in example 500 is about 16 kbytes.

Figure 6:
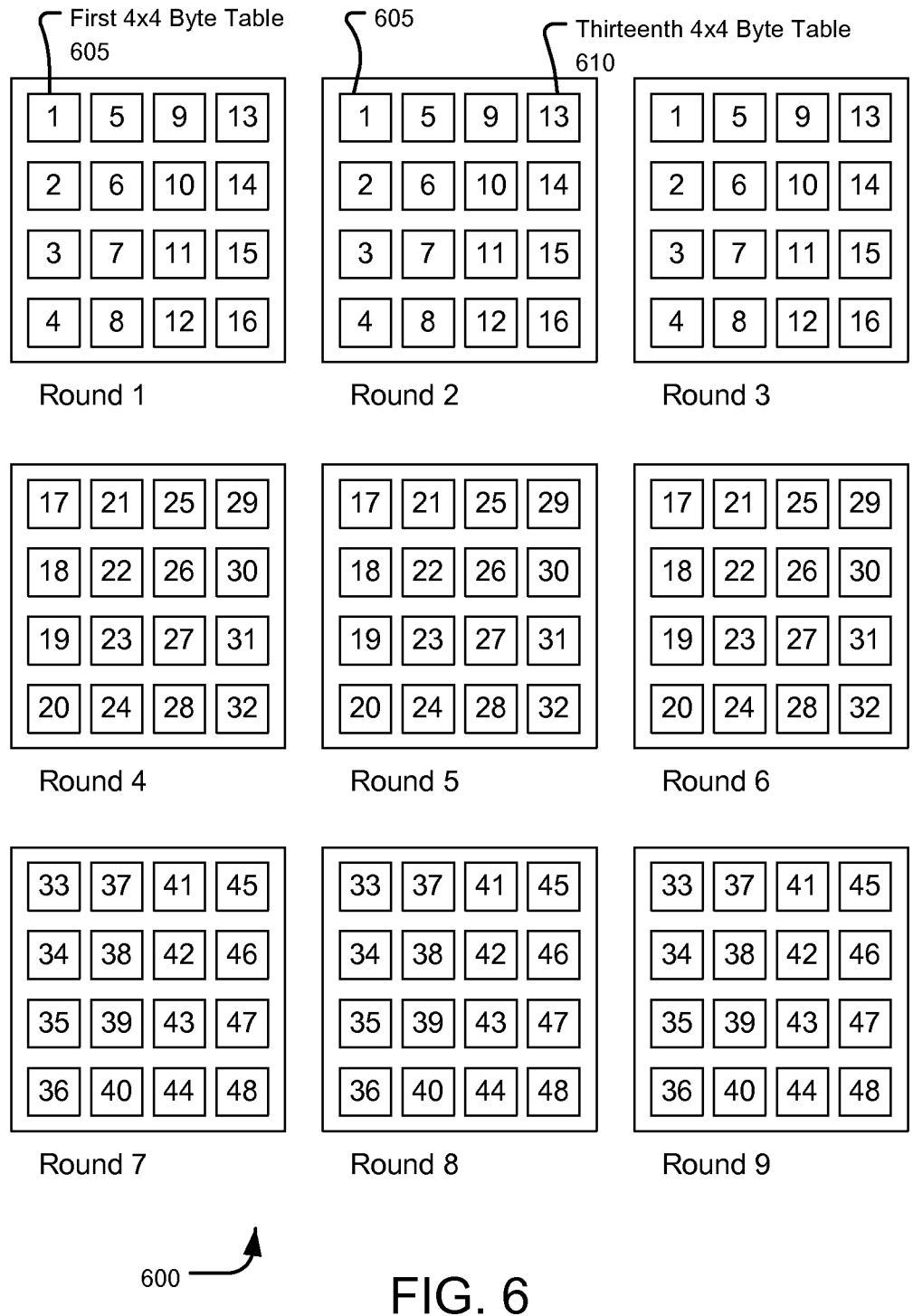

FIG. 6 illustrates an example 600 where a total of 48 unique T2 tables are provided, and reused in the pattern illustrated. Example 600 illustrates a pattern where distinct respective portions of the T2 tables are used for 3 round groupings. As in FIG. 5, a few of the tables are identified in a few places where they appear, e.g., first table 605, and thirteenth table 610. Since example 600 includes 48 T2 tables, a memory footprint for these tables would be around 48 kbytes.

Figure 7:
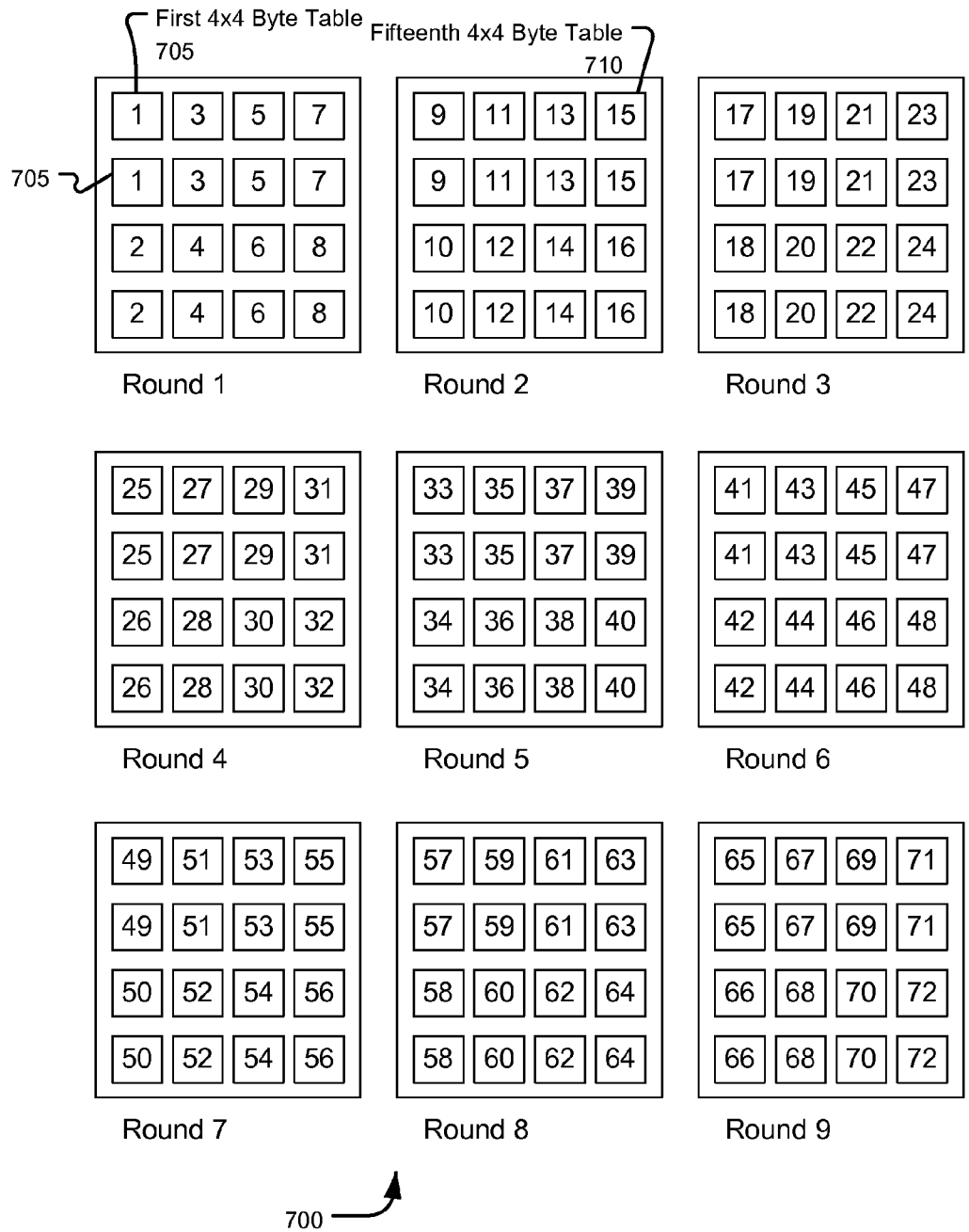

FIG. 7 illustrates a further example 700, where a total of 72 T2 tables are provided and used in a manner depicted, which includes that each T2 table is used for two different T1 tables in a given round, as illustrated by first table 705 appearing in a first column, first row and in a second column first row for the T1 tables of round 1. This example, with 72 tables, would have a T2 table memory footprint of around 72 kbytes.

Figure 8:
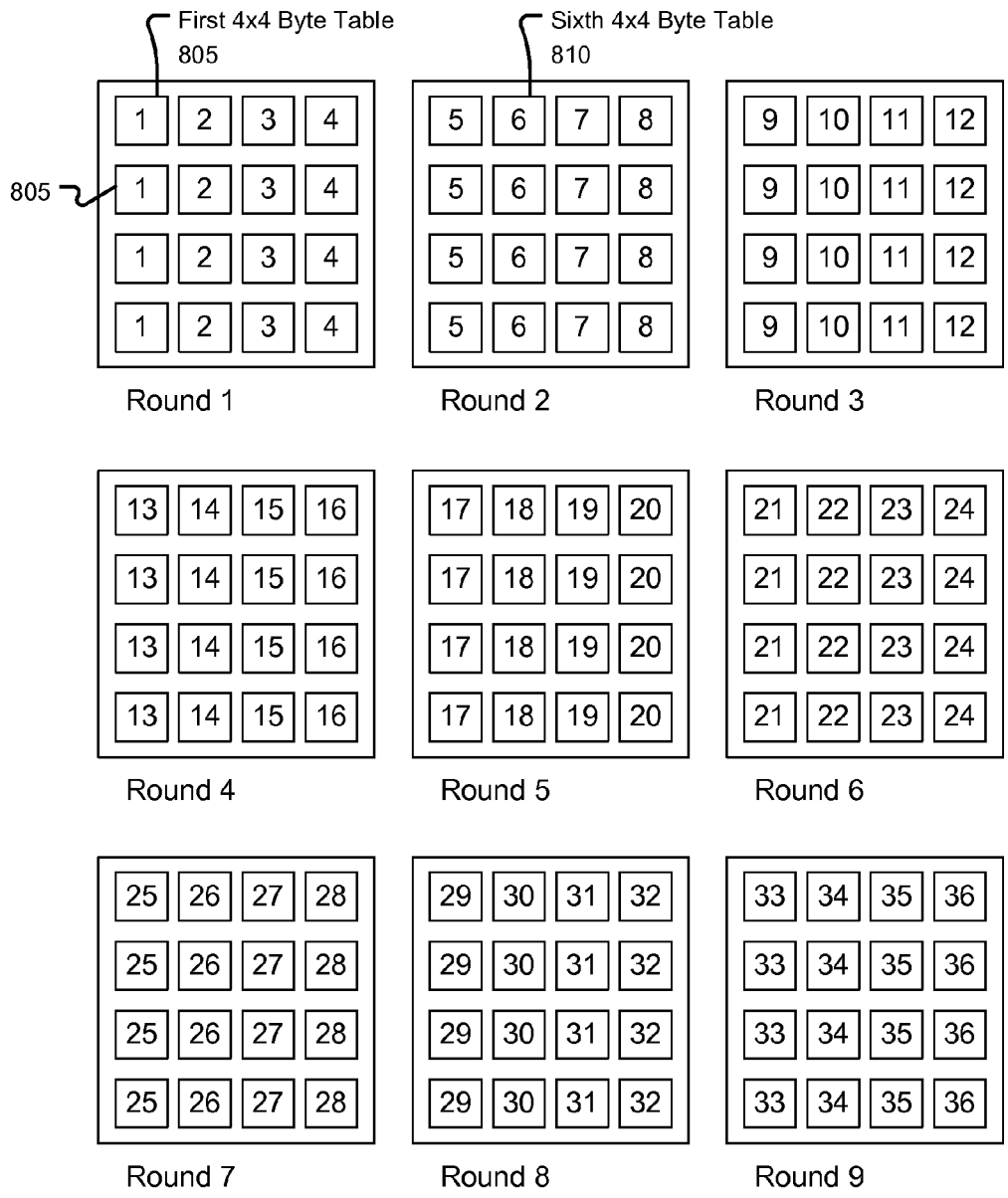

FIG. 8 illustrates a further example 800, where a total of 36 T2 tables are used provided and used in a manner depicted. In example 800, each T2 table is reused for each T1 table of a column during a round, but is not reused between rounds. For example first table 805 is shown as appearing in round 1 in all four rows, similarly, a sixth table 810 appears in all 4 rows of a second state column in round 2. With 36 tables, the T2 table memory footprint for example 800 would be approximately 36 kbytes.

Figure 9:
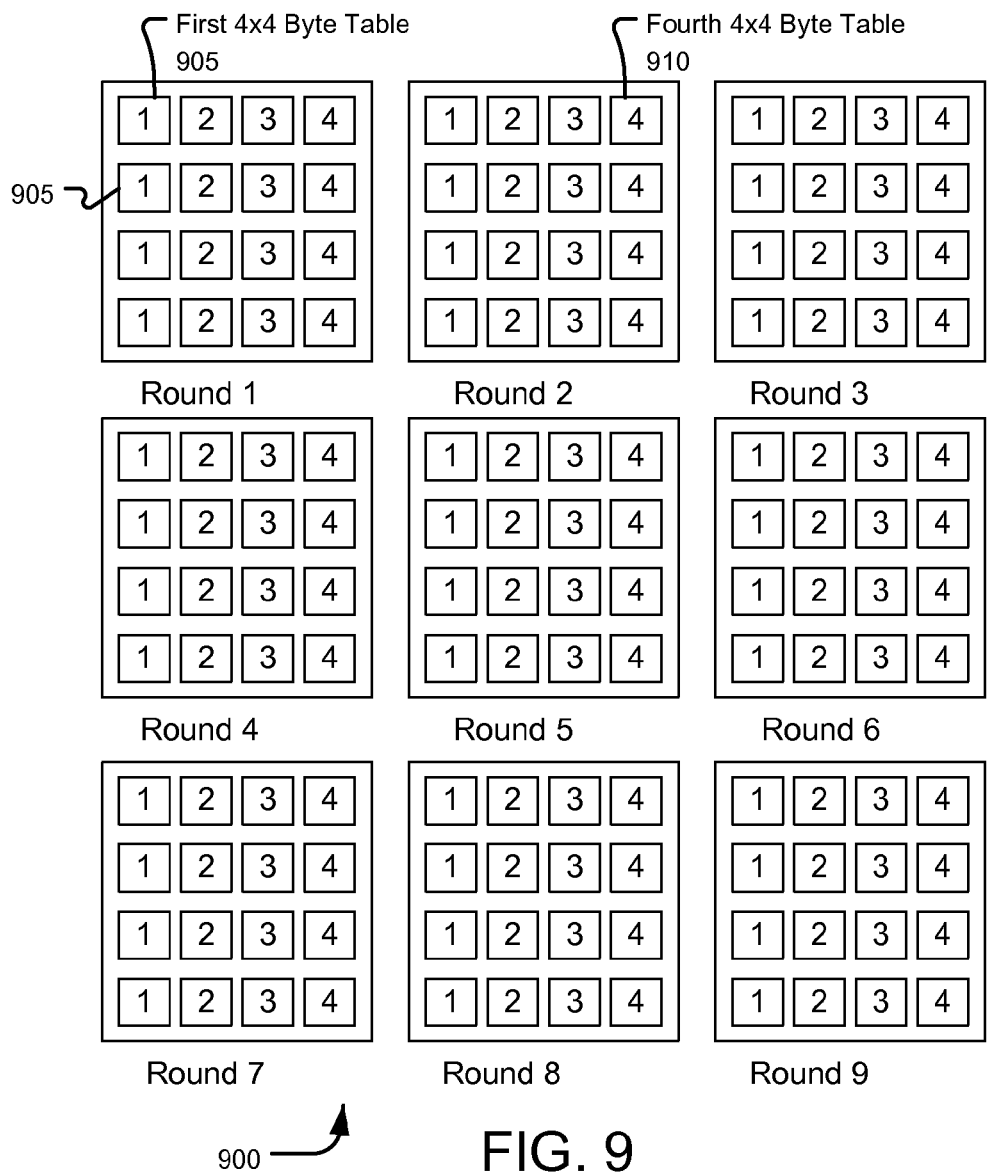

FIG. 9 illustrates a further example 900 where a total of 4 distinct T2 tables are used in a manner depicted. Here, T2 tables are reused both within a round and between rounds. For example, first table 805 appears in all rows of the first column of state in all rounds, similarly fourth table 910 appears in all rows of the fourth column of state in all rounds. Example 900, with 4 T2 tables, has a T2 memory footprint of about 4 kbytes.

Other examples of T2 table patterns can include combining aspects related to the respective patterns of FIGS. 5-7 and FIGS. 8-9. For example, an additional example pattern for reuse of T2 tables can include reusing two T2 tables per column (i.e., 8 T2 tables used in each round) in each of 3 rounds, and then cycling to a different set of 8 T2 tables for subsequent 3 round groups. This example pattern thus uses 24 total T2 tables, for a T2 table memory footprint of around 24 kbytes.

Another example T2 table reuse pattern would be to use 2 distinct T2 tables per column, thus using 8 T2 tables per round, and using the same T2 tables for all 9 rounds. Thus, this example reuse pattern would use 8 distinct T2 tables, for a T2 table memory footprint of around 8 kbytes.

Another example T2 table reuse pattern would be to use a distinct T2 table for 1 column of state, meaning that 4 distinct T2 tables would be used in a round, and to use those same T2 tables for a number of rounds. In a more particular example, the same T2 tables could be reused for 3 rounds, thus requiring a total of 12 distinct T2 tables in this particular example, for a T2 table memory footprint of around 12 kbytes.

In each of the above examples, there is a reuse of the T2 tables between and/or within rounds of encryption or decryption, while T1 tables embed round key material for a specific key, and so are not reused between or within encryption/decryption rounds on a given data block.

Figures 10, 11:
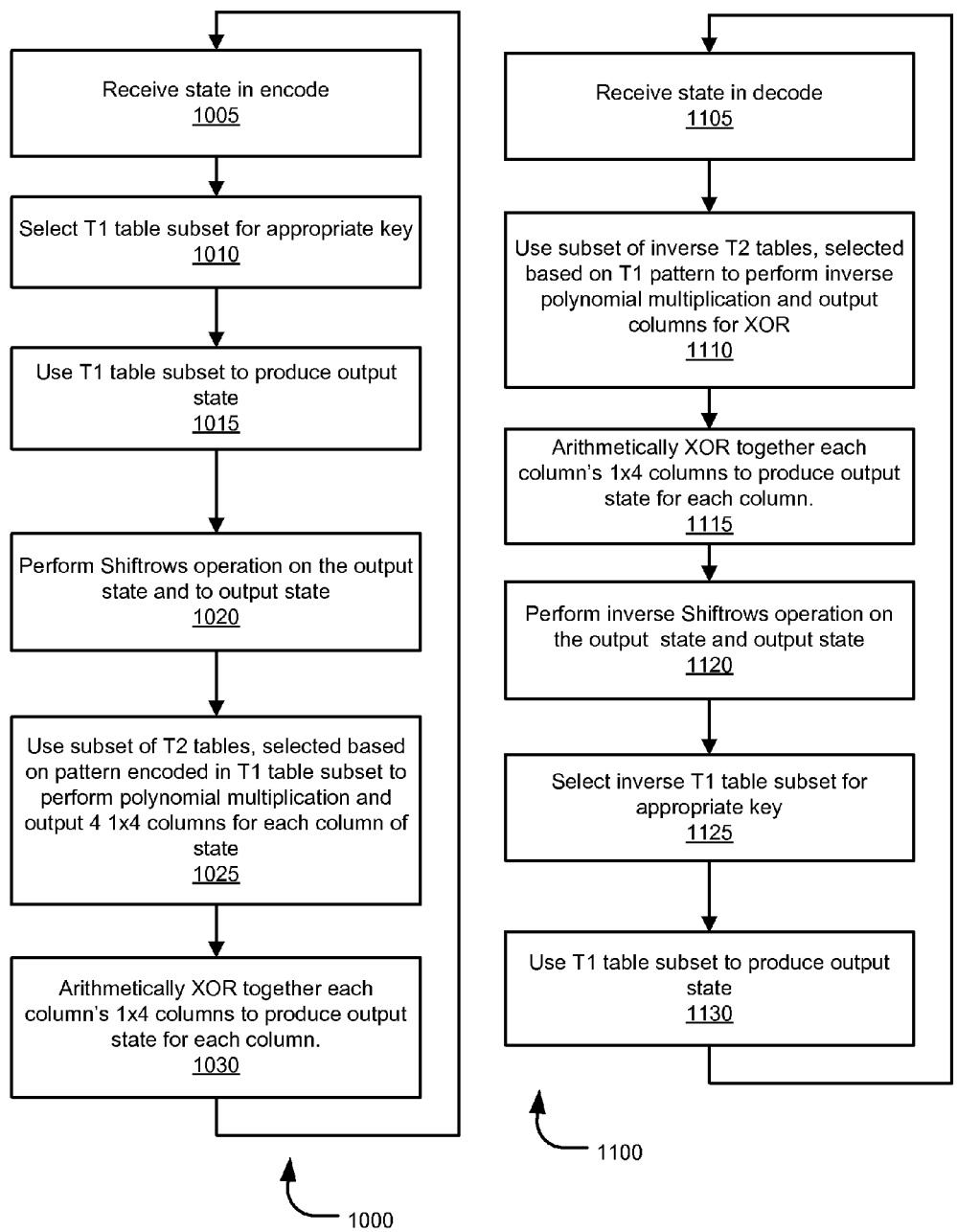
FIG. 10 illustrates an encrypting method.
FIG. 11 illustrates a decrypting method.

FIG. 10 illustrates steps of a method 1000 used in encoding. Method 1000 receives 1005 state during encrypt (from a perspective of rounds 1-9, as described above). Method 100 also includes selecting 1010 a T1 table subset for an appropriate AES key, and using 1015 that subset to produce output state from the received state. Step 1010 can include a step of selecting from among T1 table subsets corresponding to a plurality of keys. As will be explained below, a masking pattern can be selected and applied such that respective sets of T1 tables embedding round key material for different keys ultimately will use the same subsets of T2 tables, allowing multiple keys while avoiding increasing a T2 table memory footprint.

A Shiftrows operation is performed 1020 on the state outputted in 1015 to produce output state. Method 1000 also includes using 1025 a subset of T2 tables selected based on a pattern used in producing the selected T1 table subset to produce 4 columns that are XORed together at step 1030 to produce one column of state to be received at step 1005 (so that the steps 1025 and 1030 can be performed once for each of 4 columns of state, or in other architectures, such as a SIMD architecture, the steps can be parallelized.)

FIG. 11 illustrates steps of a method 1100 used in decoding (again, starting from a point where a round uses both Inverse MixColumns and AddRoundKey). Method 1100 includes receiving 1105 state during decryption, performing inverse T2 table lookups, where the T2 tables are selected according to a desired pattern, as described above (can be different from an encrypting pattern, if one was used to produce the ciphered block being decrypted). Output from polynomial multiplication 1110 includes four columns for each column of state. The four columns are XOR'ed arithmetically to produce one column of state (and thus there are 16 total XOR operations to produce the 4 columns of state outputted to 1120). Method 1100 includes performing an inverse Shiftrows operation on the state from 1115, and outputting state.

Method 1100 also includes selecting 1125 a T1 table subset (e.g., 144 tables T1 tables for each AES key used, 16 of which are used for each of 9 rounds). Selecting 1125 an appropriate inverse T1 table subset can include selecting from T1 table sets corresponding to a plurality of different keys. As discussed with respect to encryption, a variable and repetitious masking pattern allows reuse of the same Inverse T2 table subsets for each respective round for each different key. The selected T1 table subset is used to produce output state provided for a subsequent round by using bytes from the state from 1125 as indexes into different ones of the subset of T1 tables.

These examples primarily were framed from a perspective of using one AES key in an encryption and/or decryption process, to illustrate how T2 tables can be shared for T1 tables (including inverse tables for decoding), according to their respective descriptions and usages during AES operations. However, in many implementations it is contemplated that a plurality of AES keys may be embedded in respective separate sets of T1 tables, and share T2 tables among the separate sets of T1 tables. For example, three AES keys can have their round key material embedded in respective different sets of 160 T1 tables, which each are respectively formed to produce indexing output in a masking pattern for using the same T2 tables.

For example, each T1 table in the same respective position for several different AES keys can be formed to use the same T2 table, such that patterns of usage among T1 tables for different keys can be made the same. Because T2 tables are four times bigger than T1 tables, many more AES keys can be used in encrypting a given amount of information while remaining within a maximum memory footprint. Also, since a total amount of T2 tables can be made smaller for a given number of T1 tables, updating the T2 tables more regularly can be easier. For example, it may be prohibitive to update 400 kbytes of T2 tables on a weekly, daily or hourly basis, but updating 4 kbytes (T1 table size) of information may be quite feasible. In some cases, it may be desirable to implement a large number of AES keys, for example, implementing a different AES key for each block of a given set of data blocks. Additionally, multiple distinct streams of data, encrypted with different AES keys can use the same set of T2 tables. Execution and memory accesses can be staggered to allow a pipelined concurrency for such streams if desired.

In some examples involving a plurality keys, embedded in respective T1 table sets, there can be up to 144 T2 tables, where each T2 table is used only once for each key, but is used in the same pattern for each subsequent key of the plurality. These examples also can save In the above description, both encryption and decryption were accomplished partially with table lookups using two different types of tables. A first type of table (T1) embeds round key material for a particular key, and when indexed with bytes of state in properly masked format, operates on the state to effect addition of key material to the state, as well as a byte substitution operation. The state continues in a masked format. A second type of table is constructed to be indexed with bytes of the masked state (following a row shifting operation). The T1 tables are constructed so that the masking effected by these tables allows the same T2 table to be indexed by multiple bytes of masked state, while still effecting an appropriate polynomial function of the T2 tables. Ultimately, an input and an output from this masked encryption process is the same as input and output that would have been present in an unmasked implementation of the same encryption algorithm, if using the same key. Therefore, a masking pattern used in encoding a given block of data can be different from a masking pattern used in decoding a ciphered block corresponding to that data. In other words, the same round key material can be embedded in T1 tables (and Inverse T1 tables) that cause different patterns of T2 table reuse. As also described, different symmetric keys can have corresponding sets of T1 tables that are constructed to have the same masking pattern, allowing reuse of T2 tables in the same pattern among encryption operations for each key (these concepts also apply to decryption T1 and T2 tables). T1, Inverse T1, T2 and Inverse T2 tables can be constructed based on the principles disclosed in Chow.

The various examples described above are provided by way of illustration only and should not be construed as limiting. For example, AES encrypt and decrypt operations can be useful in a wide variety of applications, and a person of ordinary skill would be able to apply the disclosures above to an application of interest. In that application, a person of ordinary skill also would recognize various modifications and changes that may necessary or desirable for that particular application, while still following the disclosures for the examples herein. By further example, the AES cipher, and the generally names associated with its constituent operations were used in the examples and many claims herein. However, it should be understood that these names and the AES example were used for clarity and convenience, and another block cipher that implements these steps also can be adapted according to the present examples. By particular example, the SubBytes operation is for scrambling bytes (confusion), the ShiftRows operation is for scramblings rows (a diffusion) and the MixColumns is for scrambling columns (a diffusion). Thus, other implementations for such confusion/diffusions scrambling steps can be adapted according to these disclosures.

We claim:

1. A computer implemented method comprising:
   storing a set of first lookup tables and a set of second lookup tables, wherein the set of first lookup tables and the set of second lookup tables are constructed based on a masking pattern, wherein the masking pattern allows reuse of the set of second lookup tables in an indexing operation;
   for each of a plurality of iterations:
      performing on a first masked state, an add round key operation and a bytes substitution operation to yield a second masked state, the add round operation and the bytes substitution operation performed using a subset of first lookup tables from the set of first lookup tables;
      performing a row shifting operation on the second masked state to yield a third masked state;
      performing on the third masked state, a polynomial multiplication portion of a mix columns operation to yield N columns, the polynomial multiplication portion of the mix columns operation performed using a subset of second lookup tables from the set of second lookup tables, wherein at least one of the subset of second lookup tables is reused in a present iteration or in a subsequent iteration; and
      arithmetically performing, via a processor, on the N columns, an exclusive-or portion of the mix columns operation to yield a fourth masked state, the exclusive-or portion performed without using lookup tables, wherein the polynomial multiplication further comprises indexing a selected second lookup table from the set of second lookup tables with each of a third plurality of bytes associated with the third masked state, the selected second table for each of the third plurality of bytes selected according to the masking pattern.

2. The computer implemented method of claim 1, further comprising storing plurality of sets of first lookup tables for a plurality of different symmetric keys, the plurality of sets of first lookup tables constructed based on a single masking pattern.

3. The computer implemented method of claim 1, wherein the set of second lookup tables each comprise M*N N-byte entries.

4. The computer implemented method of claim 1, wherein the masking pattern allows reuse of the set of second lookup tables in an indexing operation.

5. The computer implemented method of claim 1, wherein the plurality of iterations comprises rounds 1 through 9 of a 10 round, 128-bit AES encryption implementation.

6. The computer implemented method of claim 1, wherein the set of second lookup tables comprises at least one of 4, 8, 12, 16, 24, 32, 48, or 72 second lookup tables.

7. The computer implemented method of claim 1, wherein the subset of first lookup tables includes 16 first lookup tables, each first lookup table comprising 256 one-byte entries.

8. A computer implemented method comprising:
   storing a set of first lookup tables and set of second lookup tables, wherein the set of first lookup tables and the set of second lookup tables are constructed based on a masking pattern, wherein the masking pattern allows reuse of the set of second lookup tables in an indexing operation;
   for each of a plurality of iterations:
      performing on a first masked state, a polynomial multiplication portion of a mix columns operation to yield N columns, the polynomial multiplication portion of the mix columns operation performed using a subset of second lookup tables from the set of second lookup tables;
      performing, via a processor, on the N columns, an exclusive-or portion of the mix columns operation to yield a second masked state, the exclusive-or portion performed without using lookup tables;
      performing on the second masked state, an inverse row shifting operation to yield a third masked state; and
      performing on the third masked state, an add round key operation and a bytes substitution operation to yield a fourth masked state, the add round operation and the bytes substitution operation performed using a subset of first lookup tables from the set of first lookup tables, wherein at least one of the subset of second lookup tables is reused in a present iteration or in a subsequent iteration and wherein the polynomial multiplication further comprises indexing a selected second lookup table from the set of second lookup tables with each of a third plurality of bytes associated with the third masked state, the selected second table for each of the third plurality of bytes selected according to the masking pattern.

9. The computer implemented method of claim 8, wherein the set of second lookup tables each comprise M*N N-byte entries.

10. The computer implemented method of claim 8, wherein the masking pattern allows reuse of the set of second lookup tables in an indexing operation.

11. The computer implemented method of claim 8, wherein the plurality of iterations comprises rounds 1 through 9 of a 10 round, 128-bit AES decryption implementation.

12. The computer implemented method of claim 8, wherein the set of second lookup tables comprises at least one of 4, 8, 12, 16, 24, 32, 48, or 72 second lookup tables.

13. The computer implemented method of claim 8, wherein the subset of first lookup tables includes 16 first lookup tables, each first lookup table comprising 256 one-byte entries.

* * * * *